United States Patent
Baik et al.

(10) Patent No.: US 9,632,339 B2
(45) Date of Patent: Apr. 25, 2017

(54) 3D IMAGE DISPLAY DEVICE INCLUDING DISPLAY PANEL AND PATTERNED RETARDER

(75) Inventors: Insu Baik, Paju-si (KR); Hoon Kang, Namyangju-si (KR); Sudong Roh, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 806 days.

(21) Appl. No.: 12/643,267

(22) Filed: Dec. 21, 2009

(65) Prior Publication Data
US 2011/0025833 A1 Feb. 3, 2011

(30) Foreign Application Priority Data
Jul. 31, 2009 (KR) ........................ 10-2009-0070791

(51) Int. Cl.
*G02F 1/1333* (2006.01)
*G02B 27/22* (2006.01)
(Continued)

(52) U.S. Cl.
CPC ....... *G02F 1/1333* (2013.01); *G02B 27/2242* (2013.01); *G02B 27/26* (2013.01);
(Continued)

(58) Field of Classification Search
CPC ........ G02F 2001/133541; G02F 2001/133388; G02F 2001/133391; G02F 2001/133354; G02F 2001/133357; G02F 1/1333
(Continued)

(56) References Cited

U.S. PATENT DOCUMENTS 6,621,542 B1 * 9/2003 Aruga .................. G02F 1/1333 349/113
6,636,281 B1 * 10/2003 Kanatsu ......................... 349/58
(Continued)

FOREIGN PATENT DOCUMENTS

DE   100 59 085 A1   6/2002
GB   2460737 A       12/2009
(Continued)

OTHER PUBLICATIONS

Japanese Patent Application No. 2009-290288—JPO—Examiner Office Letter—Dated—Dec. 4, 2012.
(Continued)

*Primary Examiner* — Bao-Luan Le
(74) *Attorney, Agent, or Firm* — Morgan, Lewis & Bockius LLP

(57) ABSTRACT

A three-dimensional (3D) image display device includes a display panel including an upper substrate and a lower substrate, the lower substrate having a pixel array area overlapped with the upper substrate and a pad area formed on at least one side of the lower substrate outside the pixel array area, wherein the display panel displays a left eye image and a right eye image; and a patterned retarder attached to the display panel and having retarder patterns to apply first and second polarizations to light from the display panel corresponding to the left eye image and the right eye image, respectively, wherein the pad area includes a first area in which data pads extending from data lines of the pixel array area are formed, and a second area in which gate pads extending from gate lines of the pixel array area are formed, and wherein the first area is exposed when the display panel and the patterned retarder are attached.

8 Claims, 9 Drawing Sheets

(51) Int. Cl.
*G02B 27/26* (2006.01)
*H04N 13/04* (2006.01)
*G02F 1/1345* (2006.01)

(52) U.S. Cl.
CPC ..... *H04N 13/0434* (2013.01); *G02F 1/13452* (2013.01); *G02F 2413/01* (2013.01)

(58) Field of Classification Search
USPC .................... 348/57, 58, 15, 96; 349/46, 47
See application file for complete search history.

(56) References Cited

U.S. PATENT DOCUMENTS

| | | | | |
|---|---|---|---|---|
| 6,819,371 | B2* | 11/2004 | Kanatsu | 349/58 |
| 6,995,814 | B2* | 2/2006 | Kanatsu | 349/58 |
| 7,738,055 | B2* | 6/2010 | Egi | G02F 1/133533 349/96 |
| 7,855,770 | B2* | 12/2010 | Egi | G02F 1/133533 349/141 |
| 8,154,704 | B2* | 4/2012 | Baek et al. | 349/192 |
| 2002/0085280 | A1* | 7/2002 | Jung | 359/465 |
| 2003/0095219 | A1* | 5/2003 | Lee | 349/110 |
| 2004/0012746 | A1* | 1/2004 | Kanatsu | 349/152 |
| 2005/0030466 | A1* | 2/2005 | Kanatsu | 349/149 |
| 2005/0057709 | A1* | 3/2005 | Lee | 349/106 |
| 2005/0264904 | A1* | 12/2005 | Sato et al. | 359/885 |
| 2007/0065091 | A1 | 3/2007 | Hinata et al. | |
| 2007/0069978 | A1 | 3/2007 | Daiku | |
| 2007/0177071 | A1* | 8/2007 | Egi | G02F 1/133533 349/96 |
| 2008/0143638 | A1 | 6/2008 | Kim et al. | |
| 2008/0239485 | A1 | 10/2008 | Kuroda et al. | |
| 2009/0141201 | A1* | 6/2009 | Yeh et al. | 349/15 |
| 2010/0245712 | A1* | 9/2010 | Egi | G02F 1/133533 349/61 |
| 2011/0051034 | A1* | 3/2011 | Egi | G02F 1/133533 349/61 |

FOREIGN PATENT DOCUMENTS

| | | |
|---|---|---|
| JP | S63-14518 A | 1/1988 |
| JP | 4139485 A | 5/1992 |
| JP | 6194652 A | 7/1994 |
| JP | 10227998 A | 8/1998 |
| JP | 2003-043450 A | 2/2003 |
| JP | 2003-078773 A | 3/2003 |
| JP | 2004-279932 | 10/2004 |
| JP | 2005-10738 | 1/2005 |
| JP | 2005-266438 A | 9/2005 |
| JP | 2007094035 A | 4/2007 |
| JP | 2008257207 A | 10/2008 |
| TW | 200412192 | 7/2004 |
| TW | 200725060 | 7/2007 |

OTHER PUBLICATIONS

Taiwanese Patent Application No. 098144630—TIPLO—Examination Statement—Dated—Dec. 14, 2012.
Office Action dated Jun. 24, 2014, issued by the Japanese Patent Office in Japanese Patent Application No. 2009-290288.

* cited by examiner

3D IMAGE DISPLAY DEVICE INCLUDING DISPLAY PANEL AND PATTERNED RETARDER

The present invention claims the benefit of Korean Patent Application No. 10-2009-0070791 filed in the Republic of Korea on Jul. 31, 2009, which is hereby incorporated by reference.

BACKGROUND OF THE INVENTION

Field of the Invention

The present application relates to a display device, and more particularly, to a three-dimensional (3D) image display device for displaying a three-dimensional stereoscopic image.

Discussion of the Related Art

A three-dimensional (3D) image display device (i.e., a stereoscopic image display device) displays a 3D image using a stereoscopic technique or an autostereoscopic technique.

The stereoscopic technique, which uses a parallax image of left and right eyes of a user with a high stereoscopic effect, includes a glass method and a non-glass method both of which have been put to practical use. In the glass method, a left and right parallax image is displayed on a direct view-based display device by changing a polarization direction of the left and right parallax image, and a stereoscopic image is implemented using polarized glasses. In the non-glass method, an optical plate, such as a parallax barrier or the like, for separating an optical axis of the left and right parallax image is installed in front of or behind a display screen.

As shown in FIG. 1, the glass method may employ a patterned retarder 3 for converting polarization characteristics of light incident on the polarization glasses (not shown) on a display panel 2. In the glass method, a left eye image and a right eye image are alternately displayed on the display panel 2, and the polarization characteristics of light incident on the polarized glasses are converted by the patterned retarder 3. Through this operation, the glass method implements a 3D image by spatially dividing the left eye image and the right eye image. In FIG. 1, a backlight unit 1 irradiates light to the display panel 2.

As shown in FIGS. 2 and 3, the display panel 2 includes an upper substrate 2A and a lower substrate 2B. Pixels are formed at crossings of data lines and gate lines on a display area of the lower substrate 2B, and data pads extending from data lines and gate pads extending from gate lines are formed on a pad area at an outer side of the display area. The data pads are electrically connected with source integrated circuits (ICs) 5, and the gate pads are electrically connected with gate ICs 7. The source ICs 5 are mounted on source tape carrier packages (TCPs) 4 of a tape film type, which is then connected to the data pads through a tape automated bonding (TAB) process. Hereinafter, the portion of the source TCPs 4 at which the source ICs 5 are connected with the data pads will be referred to as a 'source TAB'. The gate ICs 7 are mounted on the gate TCPs 6 of a tape film type, which is then connected to the gate pads through a TAB process. Hereinafter, the portion of the gate TCPs 6 at which the gate ICs 7 are connected with the gate pads will be referred to as a 'gate TAB'. Polarization films POL are attached to an upper surface of the upper substrate 2A and a lower surface of the lower substrate 2B.

As shown in FIGS. 2 and 3, the patterned retarder 3 is attached on the polarization film POL of the upper substrate 2A with the substrate made of glass as a base layer. To achieve vibration resistance or impact resistance of the patterned retarder after being attached to the display panel 2, the patterned retarder 3 generally has a size which is equal to or larger than that of the display panel 2. Namely, in the attached state, a horizontal size (X') of the patterned retarder 3 is larger than a horizontal size (X) of the display panel 2, and a vertical size (Y') of the patterned retarder 3 is larger than a vertical size (Y) of the display panel 2.

In this case, however, when the patterned retarder 3, which is larger than the display panel 2, and the display panel 2 are attached, even if the source TAB or the gate TAB is damaged or defective after attachment, as shown in FIGS. 4 and 5, a repairing process cannot be performed. As a result, if the source TAB or the gate TAB is damaged or defective after the patterned retarder 3 and the display panel 2 are attached, the display panel 2 having the patterned retarder 3 attached thereto must be discarded, thereby increasing costs.

SUMMARY OF THE INVENTION

Accordingly, the present invention is directed to a three-dimensional (3D) image display device that substantially obviates one or more of the problems due to limitations and disadvantages of the related art.

An object of the present invention is to provide a 3D image display device wherein a TAB can be repaired after a patterned retarder is attached.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a three-dimensional (3D) image display device comprises a display panel including an upper substrate and a lower substrate, the lower substrate having a pixel array area overlapped with the upper substrate and a pad area formed on at least one side of the lower substrate outside the pixel array area, wherein the display panel displays a left eye image and a right eye image; and a patterned retarder attached to the display panel and having retarder patterns to apply first and second polarizations to light from the display panel corresponding to the left eye image and the right eye image, respectively, wherein the pad area includes a first area in which data pads extending from data lines of the pixel array area are formed, and a second area in which gate pads extending from gate lines of the pixel array area are formed, and wherein the first area is exposed when the display panel and the patterned retarder are attached.

In another aspect, A display device for displaying a left eye image and a right eye image to form a three-dimensional (3D) image, the display device comprises a display panel including an upper substrate and a lower substrate, the lower substrate having a pixel array area at a central portion of the lower substrate overlapped by the upper substrate and a pad area formed on at least one side of the lower substrate outside the pixel array area; and a patterned retarder attached to the display panel and having retarder patterns to apply first and second polarizations to light from the display panel corresponding to the left and right eye images, respectively, wherein a dimension in a first direction of the patterned retarder is greater than or substantially equal to a dimension in the first direction of the upper substrate, and less than a dimension in the first direction of the lower substrate such that a pad area at a side in the first direction is exposed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Exemplary embodiments of the present invention will now be described with reference to FIGS. 6 to 12.

Figure 1:
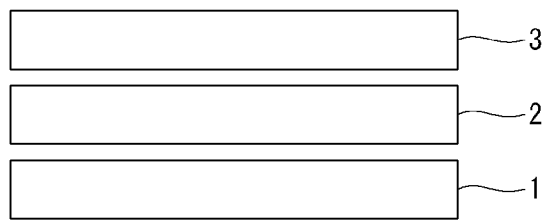
FIG. 1 schematically shows a glass-type three-dimensional (3D) image display device according to the related art.
Figure 2:
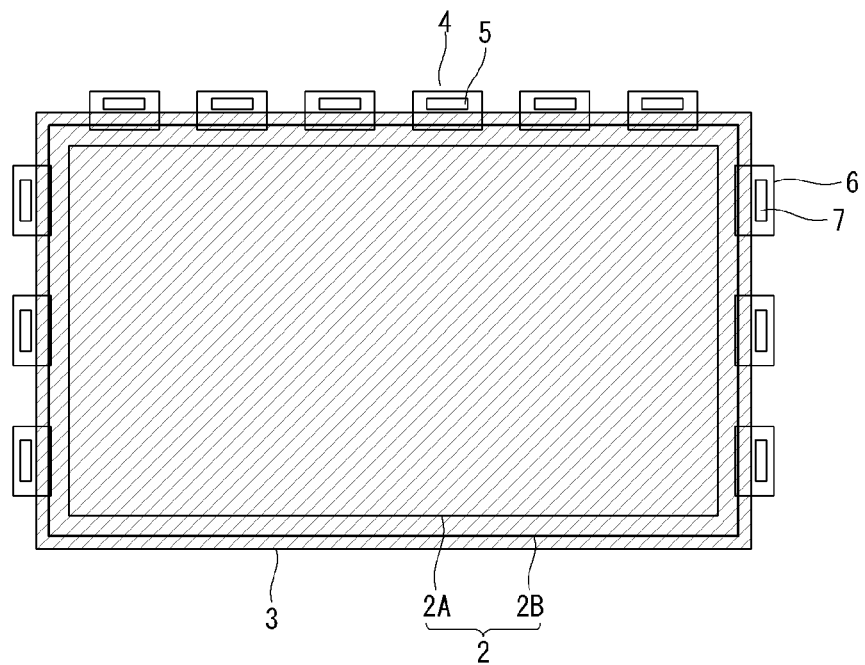
FIGS. 2 and 3 comparatively illustrate horizontal and vertical sizes of a patterned retarder and those of a display panel in a 3D image display device according to the related art.
Figure 3:
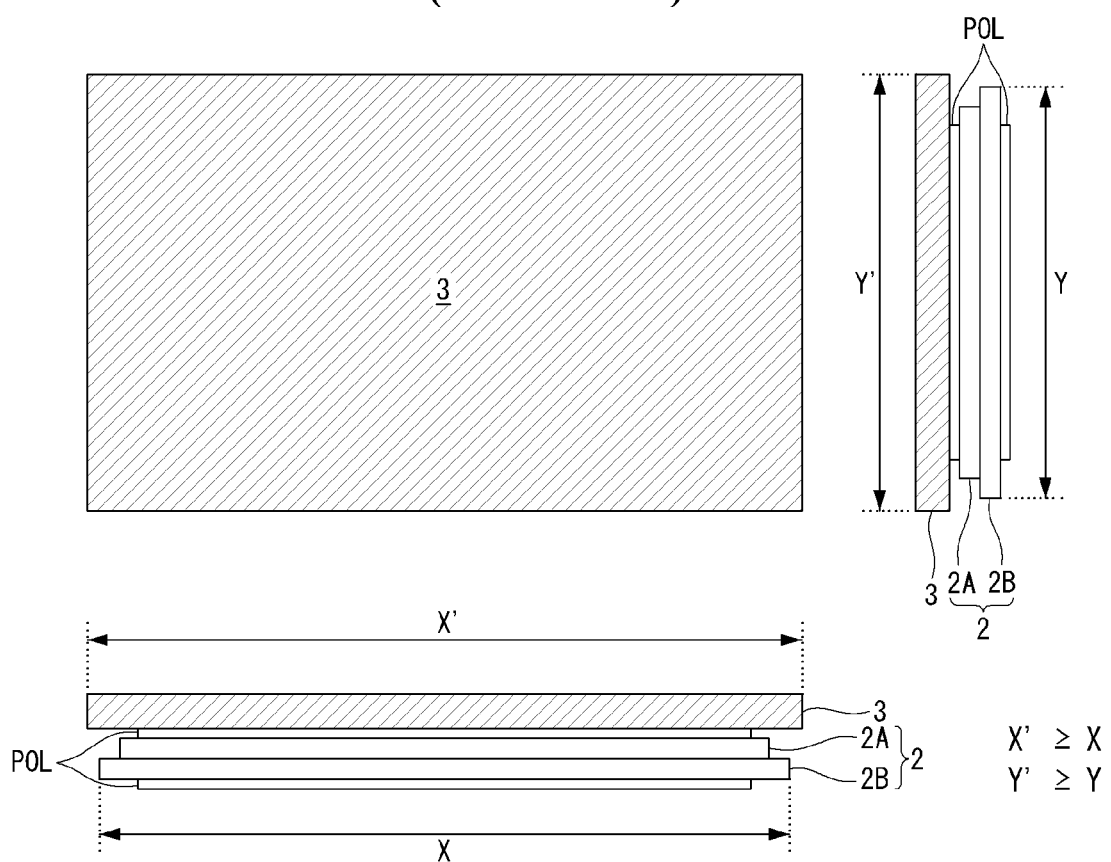
Figure 4:
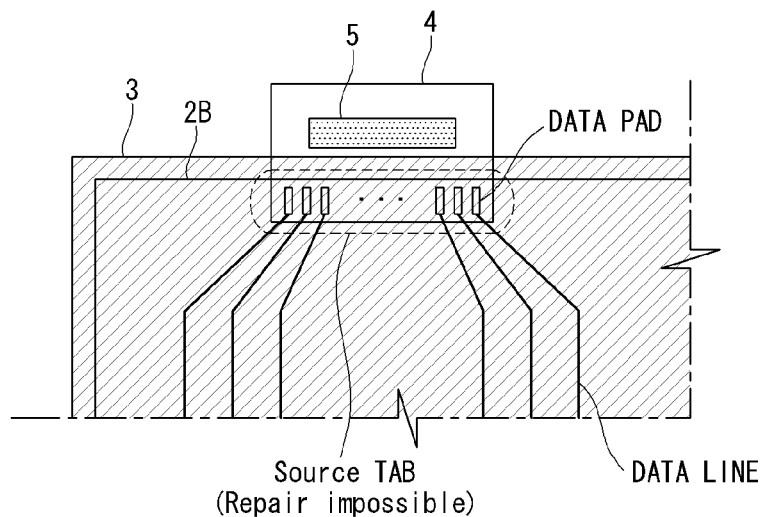
FIGS. 4 and 5 show a portion of the related art 3D image display device illustrating that repair is not possible after attachment of the patterned retarder because a source tape automated bonding (TAB) and a gate TAB are covered by the patterned retarder.
Figure 5:
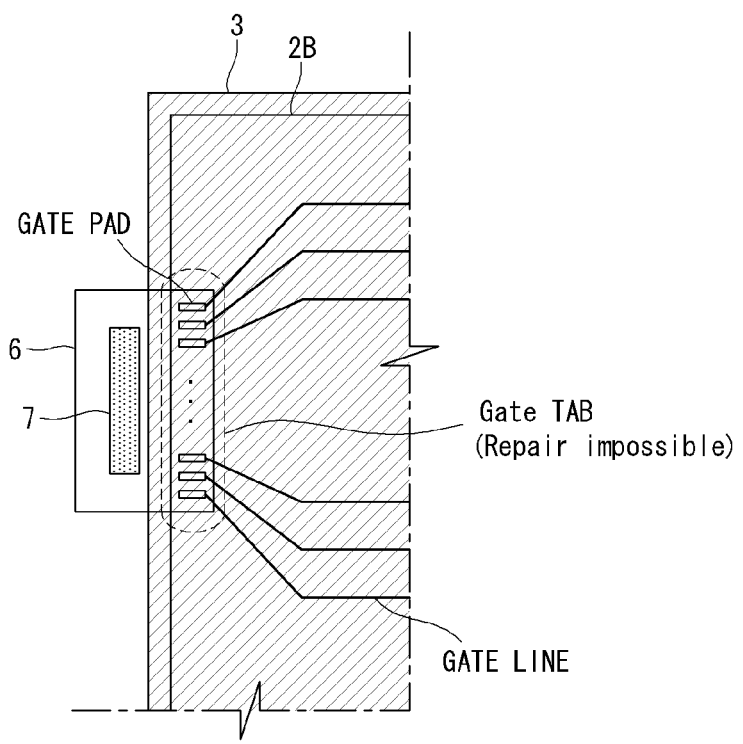
Figure 6:
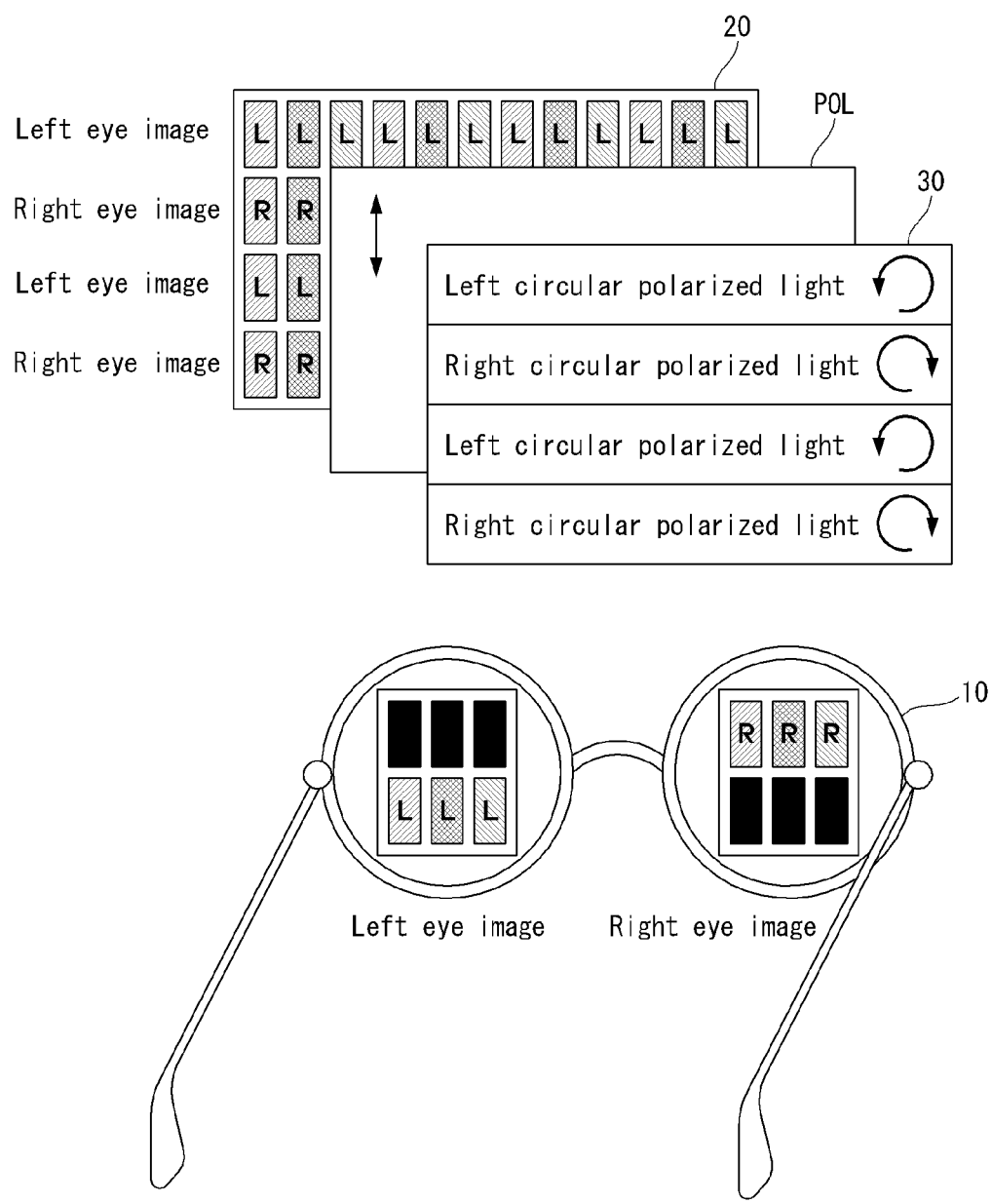
FIG. 6 is a schematic block diagram of a 3D image display device according to an exemplary embodiment of the present invention.

FIG. 6 is a schematic block diagram of a three-dimensional (3D) image display device according to an exemplary embodiment of the present invention.

With reference to FIG. 6, the 3D image display device according to an exemplary embodiment of the present invention includes polarized glasses 10, a display panel 20, a polarization film (POL), and a patterned retarder 30. The display panel 20 is implemented as a liquid crystal panel. The display panel 20 may also be implemented as a display panel of other flat panel display device, such as an organic light emitting diode (OLED) display device, a field emission display (FED), a plasma display panel (PDP), or the like.

The display panel 20 includes a lower substrate having a thin film transistor (TFT) array formed thereon, an upper substrate having a color filter array formed thereon, and a liquid crystal layer interposed between the lower and upper substrates. A polarization film POL (shown in FIGS. 8 and 10) is attached to a rear surface of the lower substrate facing a backlight unit, and an alignment film for setting a pre-tilt angle of liquid crystal is formed on an interface in contact with the liquid crystal layer. Another polarization film (POL) is attached to a front surface of the upper substrate facing the patterned retarder 30, and an alignment film for setting a pre-tilt angle is formed on an interface in contact with the liquid crystal layer.

Data lines, to which data voltages are supplied, and gate lines crossing the data lines, to which gate pulses in synchronization with data voltages are sequentially supplied, are formed on the lower substrate. Pixel electrodes are formed at crossings of the data lines and gate lines at a pixel array area of the lower substrate for displaying an image. The pixel electrodes are connected with thin film transistors (TFTs) of a TFT array and receive data voltages from the data lines. The pixel electrodes, facing a common electrode to which a common voltage is applied, apply fields to the liquid crystal layer. In a vertical field driving scheme, such as a twisted nematic (TN) mode and a vertical alignment (VA) mode, the common electrode is formed on the upper substrate, and in a horizontal field driving scheme such as an in-plane switching (IPS) mode or a fringe field switching (FFS) mode, the common electrode is formed together with pixel electrodes on the lower substrate. On a pad area outside a pixel array area of the lower substrate, data pads extending from the data lines and gate pads extending from the gate lines are formed. The data pads are electrically connected with source integrated circuits (ICs), and the gate pads are electrically connected with gate ICs. The source ICs are mounted on tape film-type source TCPs, which are then connected with the data pads through a TAB process using an anisotropic conductive film. Hereinafter, the portion where the source ICs are connected with the data pads in the source tape carrier packages (TCPs) will be referred to as a 'source TAB'. The gate ICs are mounted on tape film-type gate TCPs, which are then connected with the gate pads through a TAB process using an anisotropic conductive film. Hereinafter, the portion where the gate ICs are connected with the gate pads in the gate TCPs will be referred to as a 'gate TAB'.

A left eye image (L) and a right eye image (R) are alternately displayed in a line-by-line manner on the display panel 20. The polarization film (POL) is an analyzer attached between the upper substrate of the display panel 20 and the patterned retarder 30, allowing only particular linear polarized light, among light made incident after transmitting the liquid crystal layer of the display panel 20, to be transmitted.

The patterned retarder 30 is attached on the polarization film (POL) of the upper substrate with a transparent substrate made of glass as a base layer. A UV curable resin, such as acrylate esters, acrylate urethanes, mercaptons & photoinitiator, and the like, is commonly used to attach the patterned retarder 30. The patterned retarder 30 may include a reflection film for alignment with the display panel 20 when it is attached, two or more align keys, and first and second retarder patterns alternately formed by lines. In some configurations, the patterned retarder 30 may further include a black stripe pattern.

The align keys are formed with the same material as that of the first and second retarder patterns formed on an image display part. The align keys are simultaneously formed with the first and second retarder patterns. The reflection film overlaps with the align keys and is larger than the align keys. A plurality of align marks are formed on the pad area of the lower substrate such that they correspond to the align keys in a one-to-one manner. The patterned retarder and the lower substrate may be formed with only two align keys and two align marks, respectively. For example, the align marks may be formed at a left/right lower end or left/right upper end of the lower substrate according to circumstances. Preferably, the align marks are formed at opposite ends of the lower substrate along a longer side, and the align keys are formed at opposite ends of the patterned retarder along a longer side. Moreover, if the patterned retarder has a smaller dimension along the longer side than the lower substrate, the align keys of the patterned retarder may be formed substantially at corners thereof and the align marks may be formed at portions of the lower substrate to correspond with the align keys of the patterned retarder. By forming the align keys and align marks along a longer side, alignment errors can be reduced. Additional aspects of an aligning process using aligning units and a vision system is disclosed in Korean Patent Application No. 10-2008-0055428 filed by the same assignee as the present invention. A black stripe pattern serves to prevent the occurrence of a phenomenon that a left eye image and a right eye image are seen to overlap at an up/down viewing angle position of a stereoscopic image.

Each of the retarder patterns formed at the image display part delays the phase of light by λ (wavelength)/4 by using a birefringence medium. Optical axes of the first and second retarder patterns are perpendicular to each other. Accordingly, the first retarder pattern is disposed to face a line in which the left eye image is displayed in the display panel, to convert light of the left eye image into left circular polarized light (or right circular polarized light). The second retarder pattern is disposed to face a line in which the right eye image is displayed in the display panel, to convert light of the right eye image into right circular polarized light (or left circular polarized light). When the patterned retarder 30 is attached to the display panel 20, the source TAB is exposed, or the source TAB and the gate TAB are exposed.

A polarization film allowing only the left circular polarized light (or right circular polarized light) to pass therethrough is attached to the left eye of the polarized glasses 10, and a polarization film allowing only the right circular polarized light (or left circular polarized light) to pass therethrough is attached to the right eye of the polarized glasses 10. Accordingly, a viewer (or observer) wearing the polarized glasses 10 can view only the left eye image with his left eye and only the right eye image with his right eye, thereby seeing an image displayed on the display panel 20 as a stereoscopic image.

Figure 7:
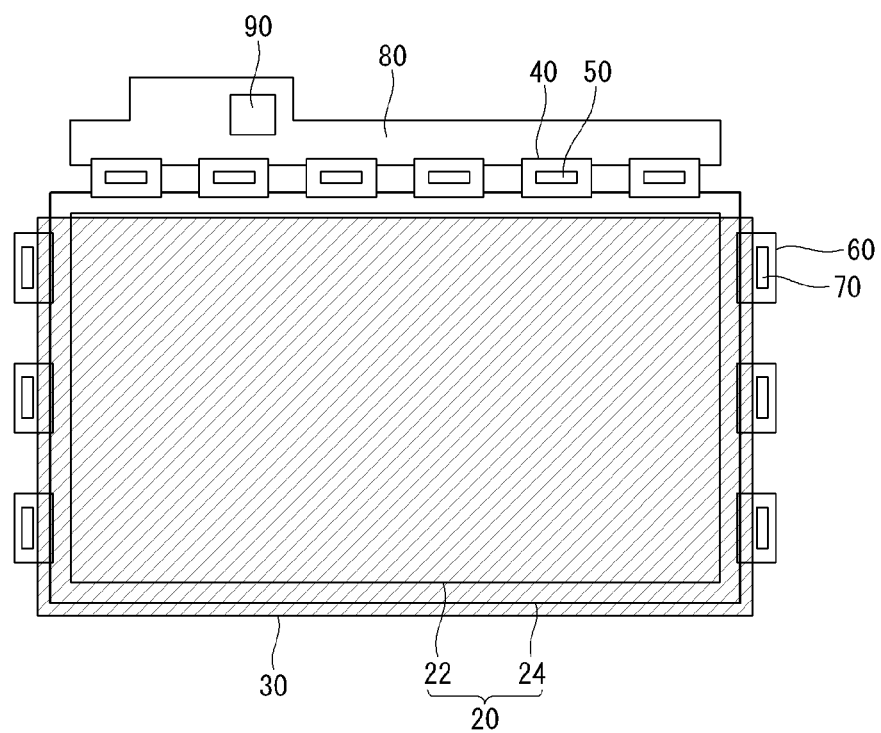
FIG. 7 illustrates an exemplary attachment of a display panel and a patterned retarder.
Figure 8:
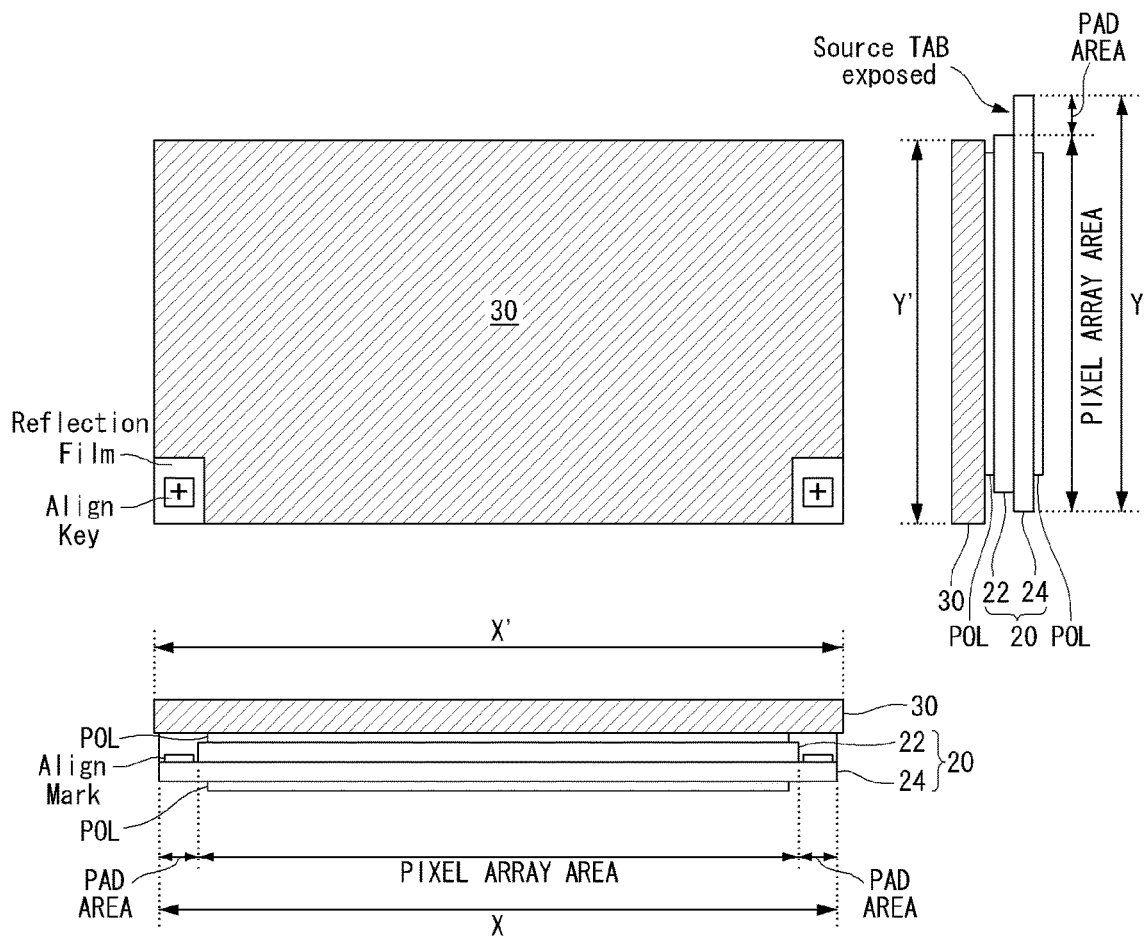
FIG. 8 comparatively illustrates horizontal and vertical sizes of the patterned retarder and those of the display panel in the attachment process of FIG. 7.
Figure 9:
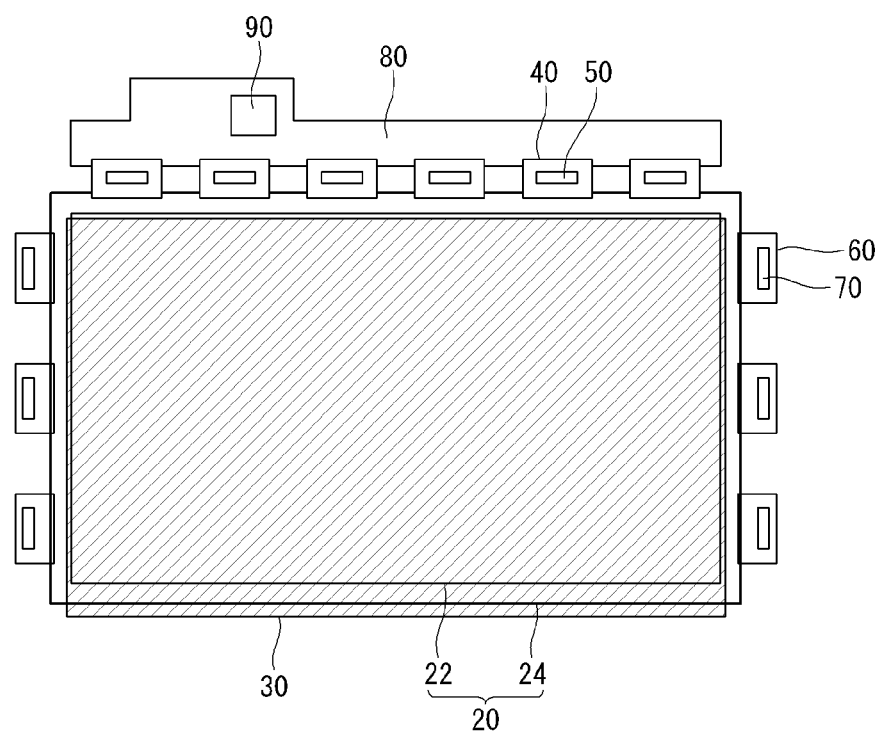
FIG. 9 illustrates another attachment of the display panel and the patterned retarder.
Figure 10:
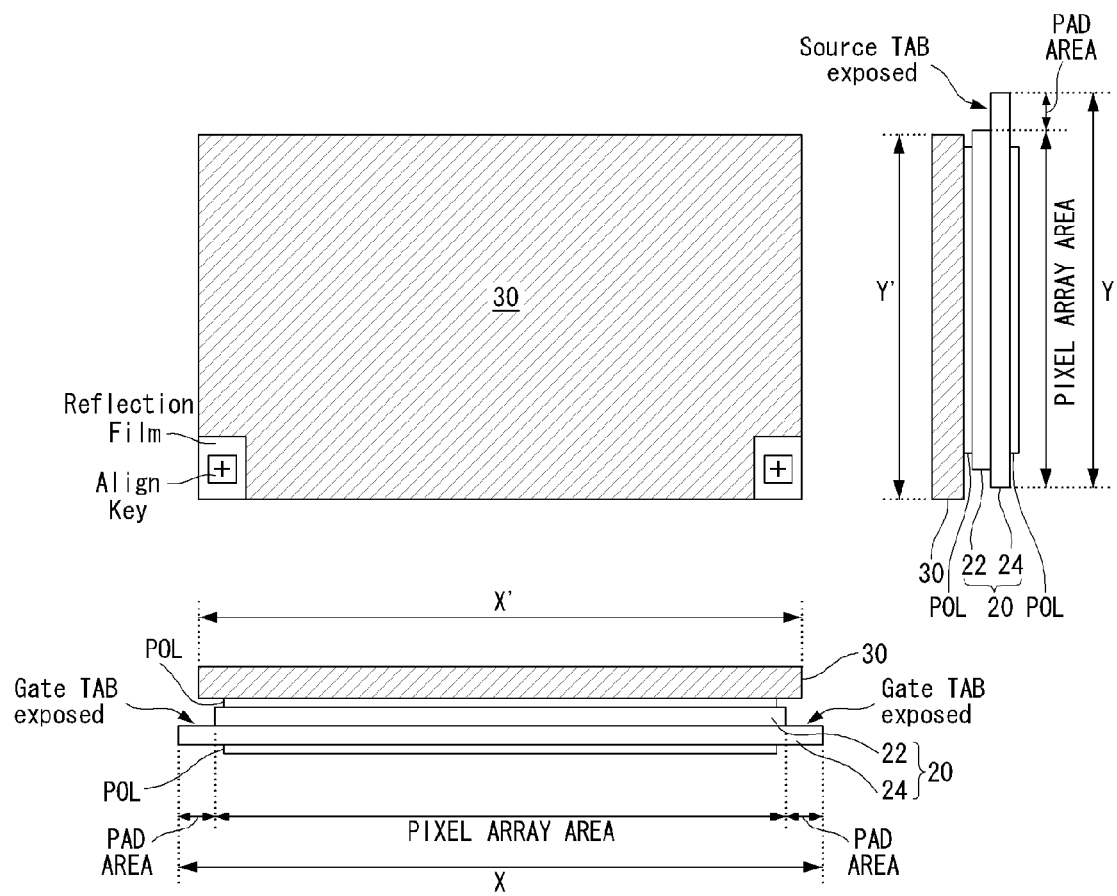
FIG. 10 comparatively illustrates horizontal and vertical sizes of the patterned retarder and those of the display panel in the attachment process of FIG. 9.
Figure 11:
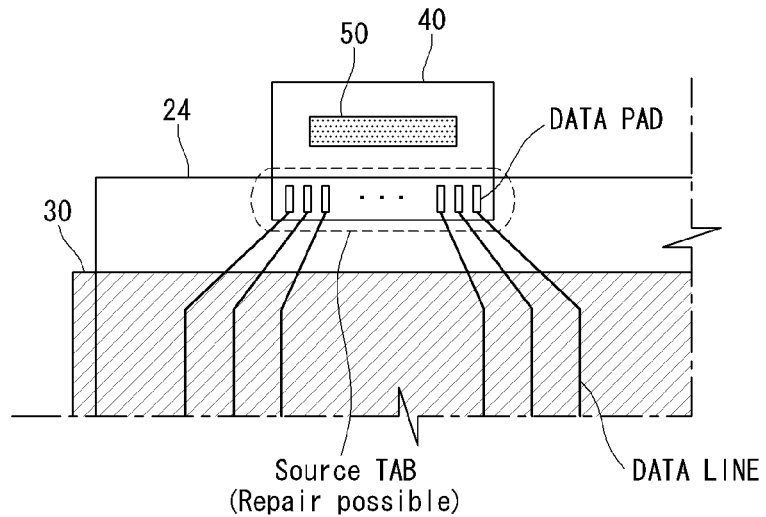
FIGS. 11 and 12 illustrate that repairing can be performed as a source TAB or a gate TAB is exposed in the attachment process.

FIGS. 7, 8, and 11 illustrate that the source TAB can be repaired in a state that the patterned retarder 30 is attached.

With reference to FIGS. 7, 8, and 11, a lower substrate 24 of the display panel 20 is larger than an upper substrate 22, generally, to form a pad part. A pixel array area of the lower substrate 24 is an area overlapping with the upper substrate 22, and a pad area is an outer area of the pixel array area. Data pads extending from the data lines and gate pads extending from the gate lines are formed on the pad area. The data pads are electrically connected to source ICs 50, and the gate pads are electrically connected to gate ICs 70. The source ICs 50 are mounted on source TCPs 40, which are then connected with the data pads through a TAB process. The source TCPs 40 are electrically connected with a source printed circuit board (PCB) 80 to supply driving signals from a controller 90 to the source ICs 50. Gate TCPs 60 supply driving signals, which are input from the controller 90 by signal lines (not shown) formed on the pad area of the lower substrate 24 in a line-on-glass manner, to the gate ICs 70. The signal lines are electrically connected to the source PCB 80 via the source TCPs 40.

The patterned retarder 30 is attached to the display panel 20 such that its align key is aligned with an align mark formed at the pad area of the lower substrate 24. When the patterned retarder 30 is attached to the display panel 20, the source TAB is exposed. As a result, a vertical size (Y') of the patterned retarder 30 is smaller than a vertical size (Y) of the lower substrate 24, and it is equal to or larger than a vertical size (i.e., a vertical size of the pixel array area) of the upper substrate 22. As a result, as shown in FIG. 11, after the patterned retarder 30 is attached to the display panel 20, even if the source TAB is damaged or defective, the source TAB can be repaired.

In addition, when the patterned retarder 30 is attached to the display panel 20, the pattern retarder 30 covers the gate TAB, rather than leaving it exposed. As a result, a horizontal size (X') of the patterned retarder 30 is equal to or larger than a horizontal size (X) of the lower substrate 24. With this configuration, after the patterned retarder 30 is attached to the display panel 20, a vibration resistance or impact resistance is improved.

FIGS. 9 to 12 illustrate that the source TAB and the gate TAB can be repaired in the state that the patterned retarder 30 is attached.

With reference to FIGS. 9 to 12, the lower substrate 24 of the display panel 20 is larger than the upper substrate 22, generally, in order to form the pad part. The pixel array area of the lower substrate 24 is an area overlapping the upper substrate 22, and a pad area is an outer area of the pixel array area. The data pads extending from the data lines and the gate pads extending from the gate lines are formed on the pad area. The data pads are electrically connected to the source ICs 50, and the gate pads are electrically connected to the gate ICs 70. The source ICs 50 are mounted on the source TCPs 40, which are then connected with the data pads through a TAB process. The source TCPs 40 are electrically connected with the source printed circuit board (PCB) 80 to supply driving signals from the controller 90 to the source ICs 50. The gate TCPs 60 supply driving signals, which are input from the controller 90 by way of the signal lines (not shown) formed on the pad area of the lower substrate 24 in a line-on-glass manner, to the gate ICs 70. The signal lines are electrically connected to the source PCB 80 via the source TCPs 40.

Figure 12:
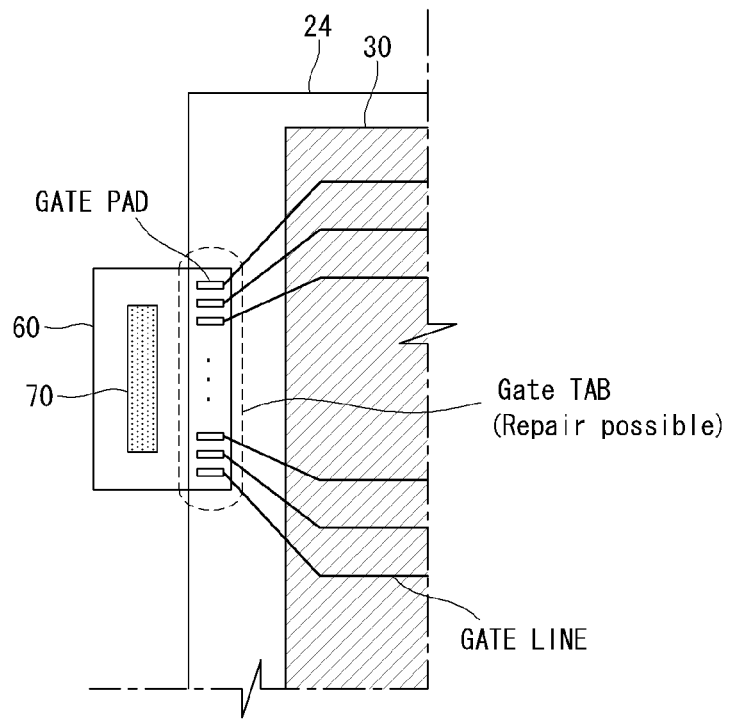

The patterned retarder 30 is attached to the display panel 20 in a state that its align key is aligned with an align mark formed at the pad area of the lower substrate 24. When the patterned retarder 30 is attached with the display panel 20, the source TAB and the gate TAB are exposed. To this end, the vertical size (Y') of the patterned retarder 30 is smaller than the vertical size (Y) of the lower substrate 24, and it is equal to or larger than the vertical size (i.e., the vertical size of the pixel array area) of the upper substrate 22. In addition, the horizontal size (X') of the patterned retarder 30 is smaller than the horizontal size (X) of the lower substrate 24, and equal to or larger than the horizontal size (i.e., the horizontal size of the pixel array area) of the upper substrate 22. As a result, as shown in FIG. 11, after the patterned retarder 30 is attached to the display panel 20, even if the source TAB is damaged or defective, the source TAB can be repaired. Also, as shown in FIG. 12, after the patterned retarder 30 is attached to the display panel 20, even if the gate TAB is damaged or defective, the gate TAB can be repaired. Meanwhile, the thickness of the patterned retarder 30 is preferably 3 mm or smaller. With such a thickness of the patterned retarder 30, the weight of the patterned retarder 30 is light. Thus, although the horizontal and vertical sizes of the patterned retarder 30 are equal to the size of the upper substrate 22, vibration resistance and impact resistance can be obtained to ensure reliability.

As described above, the 3D image display device according to the exemplary embodiments of the present invention has a number of advantages. For example, when the patterned retarder is attached to the display panel through controlling of the size of the patterned retarder, the source TAB is exposed or both the source TAB and the gate TAB are exposed. Thus, after the patterned retarder is attached to the display panel, even if the source TAB or the gate TAB is damaged or defective, the source TAB or the gate TAB can be repaired, thereby saving costs as compared with the situation in the related art in which the display panel must be discarded if the TAB is defective.

It will be apparent to those skilled in the art that various modifications and variation can be made in the 3D image display device of the present invention without departing from the spirit or scope of the invention. Thus, it is intended that the present invention cover the modifications and variations of this invention provided they come within the scope of the appended claims and their equivalents.

What is claimed is:

1. A three-dimensional (3D) image display device, comprising:
   a display panel comprising an upper substrate and a lower substrate, the lower substrate comprising a pixel array area overlapped with the upper substrate and a pad area formed on at least one side of the lower substrate outside the pixel array area, the display panel displaying a left eye image and a right eye image;
   a patterned retarder comprising retarder patterns configured to apply first and second polarizations to light from the display panel corresponding to the left eye image and the right eye image, respectively; and
   a first polarizing film attached to the upper substrate between the upper substrate and the patterned retarder,
   wherein the upper substrate is between the lower substrate and the patterned retarder,
   wherein the pad area does not overlap the upper substrate and the patterned retarder,
   wherein a size of the patterned retarder is smaller than that of the lower substrate, and
   wherein the size of the patterned retarder is larger than that of the upper substrate.

2. The three-dimensional (3D) image display device according to claim 1, wherein:
   the patterned retarder includes two or more align keys and a reflection film at corresponding positions to align marks formed on the upper substrate or the lower substrate;
   the align keys comprise a same material as that of the retarder patterns; and
   the reflection film overlaps with and is larger than the align keys.

3. The three-dimensional (3D) image display device according to claim 1, wherein the patterned retarder, in a vertical direction, exposes an upper part of the lower substrate and covers a lower part of the lower substrate.

4. A display device for displaying a left eye image and a right eye image to form a three-dimensional (3D) image, the display device comprising:
   a display panel comprising an upper substrate and a lower substrate, the lower substrate comprising a pixel array area at a central portion of the lower substrate overlapped by the upper substrate and a pad area formed on at least one side of the lower substrate outside the pixel array area;
   a patterned retarder disposed on the upper substrate and comprising retarder patterns configured to apply first and second polarizations to light from the display panel corresponding to the left and right eye images, respectively; and
   a first polarizing film attached to the upper substrate between the upper substrate and the patterned retarder,
   wherein a dimension in a first direction of the patterned retarder is greater than or substantially equal to a dimension in the first direction of the upper substrate, and less than a dimension in the first direction of the lower substrate such that the pad area at a side in the first direction is exposed,
   wherein a size of the patterned retarder is larger than that of the upper substrate, and
   wherein the pad area does not overlap the upper substrate and the patterned retarder.

5. The display device according to claim 4, wherein a dimension in a second direction of the patterned retarder is greater than or substantially equal to a dimension in the second direction of the upper substrate.

6. The display device according to claim 4, wherein the patterned retarder applies left and right circular polarizations to light from the display panel.

7. The display device according to claim 4, wherein:
   the patterned retarder includes two or more align keys and a reflection film at corresponding positions to align marks formed on the upper substrate or the lower substrate;
   the align keys comprise a same material as that of the retarder patterns; and
   the reflection film overlaps with and is larger than the align keys.

8. The display device according to claim 4, wherein the patterned retarder, in the first direction, exposes an upper part of the lower substrate and covers a lower part of the lower substrate.

* * * * *